Feb. 28, 1961 A. D. SINDEN ET AL 2,973,084
REVERSIBLE DRIVE FOR MOVING SIDEWALKS AND THE LIKE
Filed April 4, 1957 2 Sheets-Sheet 1
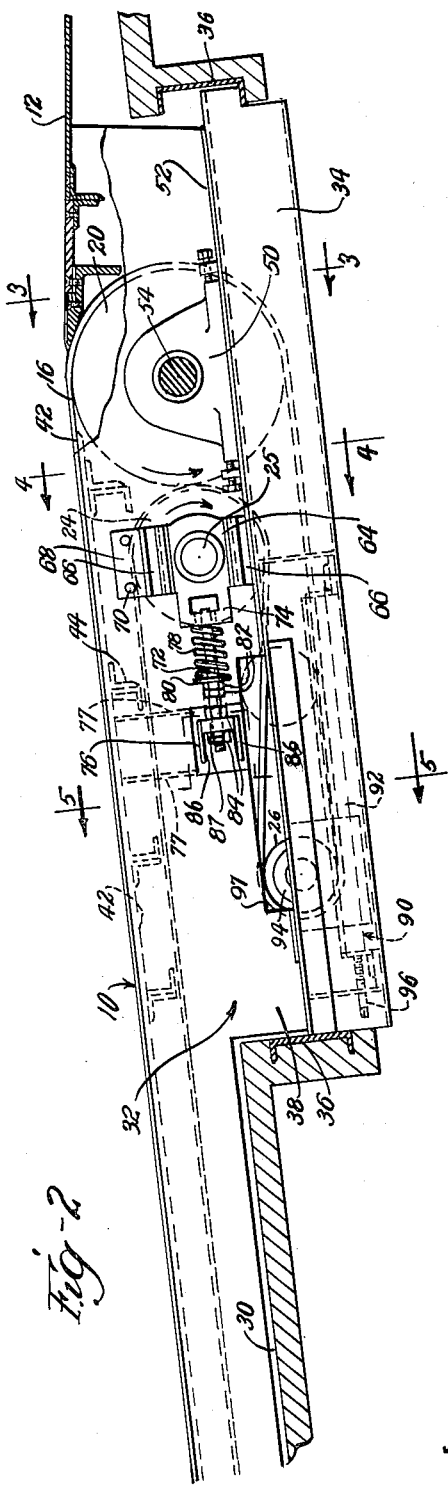
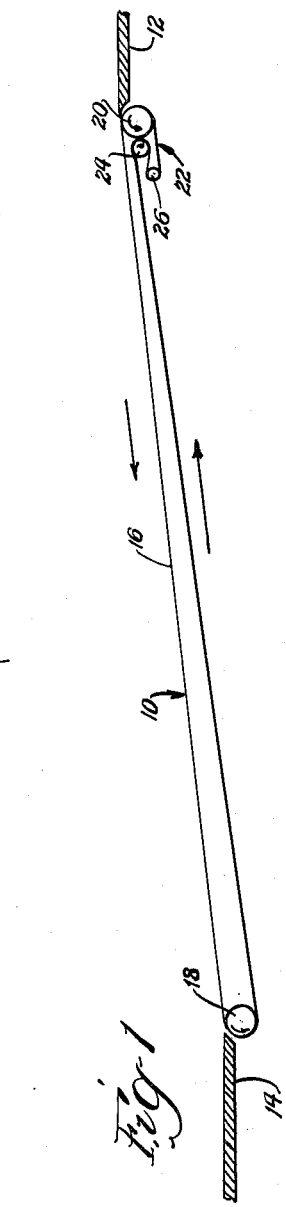
INVENTORS.
Alfred D. Sinden &
Robert O. Schaeffer
By: Mann, Brown & McWilliams
Attys.

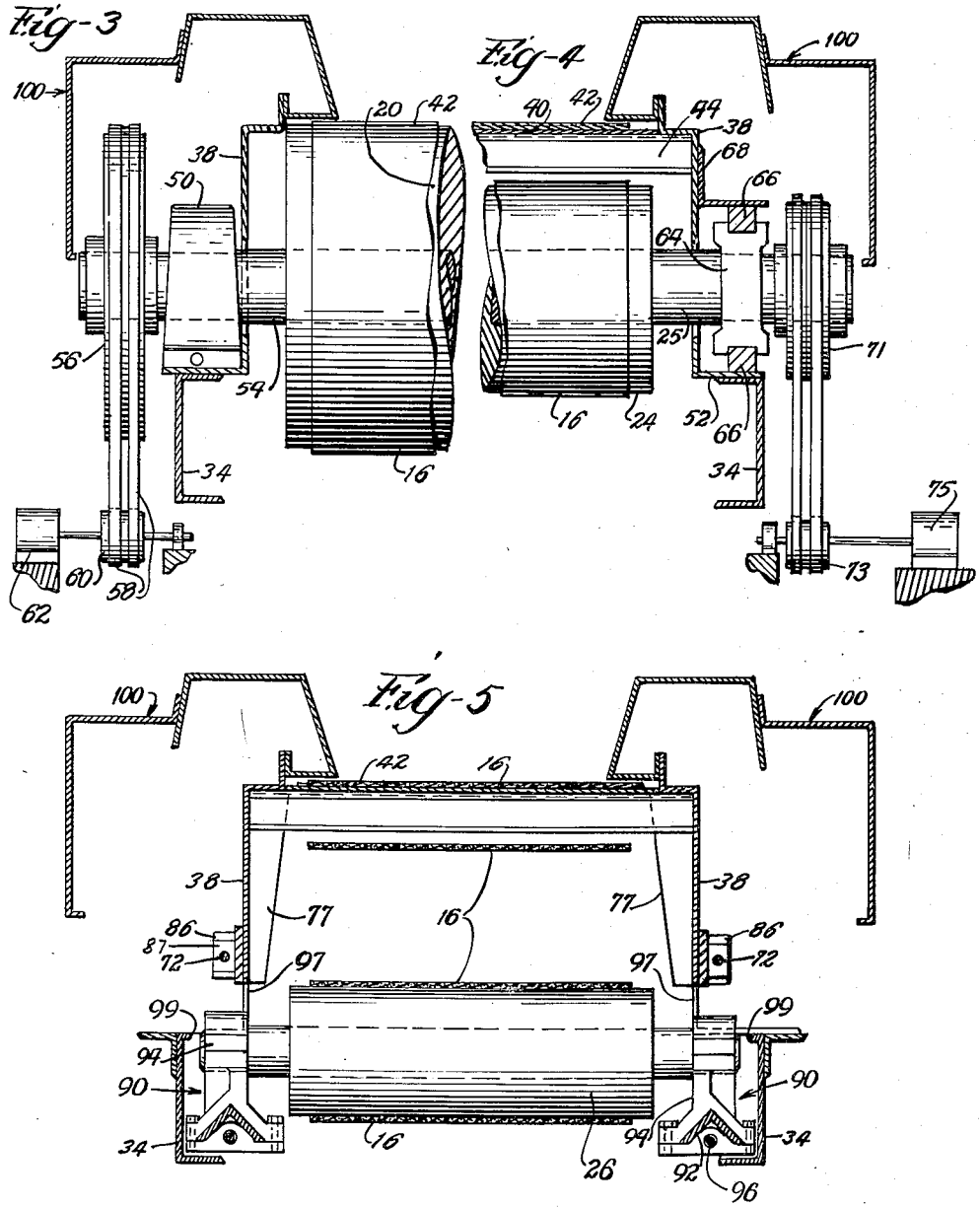

United States Patent Office 2,973,084
Patented Feb. 28, 1961

2,973,084

REVERSIBLE DRIVE FOR MOVING SIDEWALKS AND THE LIKE

Alfred D. Sinden, Aurora, and Robert O. Schaeffer, Elgin, Ill., assignors to Stephens-Adamson Mfg. Co., Aurora, Ill., a corporation of Illinois Filed Apr. 4, 1957, Ser. No. 650,734

2 Claims. (Cl. 198—203)

Our invention relates to a reversible drive for moving sidewalks and the like, and more particularly, to a reversible drive for moving sidewalks and the like that have an inclined path of operation.

When a moving sidewalk or other endless conveyor is mounted at an incline, difficulty has heretofore been experienced in driving the conveyor so that the upper run thereof, which carries the load, moves downwardly. This is because slack momentarily develops adjacent the driving pulleys of the conveyor after the load is applied to the upper run, which causes slip at the driving pulleys and consequent stopping of the conveyor. In the past, this has meant that it was not feasible to operate inclined conveyors, and particularly moving sidewalks, downwardly.

A principal object of our invention is to provide a driving arrangement for inclined endless conveyors that insures a positive drive whether the conveyor is driven upwardly or downwardly.

Another object of the invention is to provide a simplified reversible drive arrangement for endless conveyors.

A further object of the invention is to provide a drive for inclined endless conveyors that permits the conveyor to be driven in either direction with equal facility and efficiency of operation.

Still a further object of the invention is to provide an endless conveyor including a reversible drive therefor which occupies a space of minimum depth along the length of the conveyor.

Yet a further object of the invention is to provide a reversible drive for an endless belt conveyor that permits the use of a lighter take-up and a less expensive belt than has been heretofore thought possible.

Still another object of the invention is to provide an endless conveyor that is economical of manufacture, convenient in use, and readily adapted for a wide variety of applications in carrying both passengers and goods.

Other objects, uses, and advantages will be obvious or become apparent from a consideration of the following description and the accompanying drawings.

In the drawings:

Figure 1 is a diagrammatic side elevational view illustrating our improved drive applied to an inclined moving sidewalk;

Figure 2 is a side elevational view, partially in section, illustrating in greater detail a specific embodiment of our invention;

Figure 3 is a fragmental cross-sectional view along line 3—3 of Figure 2;

Figure 4 is a fragmental cross-sectional view along line 4—4 of Figure 2; and

Figure 5 is a cross-sectional view along line 5—5 of Figure 2.

Figure 1 diagrammatically illustrates an inclined moving sidewalk generally indicated by reference numeral 10 and extending between upper and lower passenger platforms 12 and 14. The moving sidewalk 10 comprises an endless passenger conveyor belt 16 trained over end pulleys 18 and 20. The other structure normally associated with the belt conveyor 16 for supporting same is omitted in the showing of Figure 1 in interests of simplicity.

Heretofore, when a conveyor such as belt 16 has been driven downwardly, that is, in the direction of the arrows of Figure 1, slack momentarily has developed in the belt adjacent the drive thereof when passengers step onto the upper run from platform 12. This slack results in slippage between the belt and its driving pulleys with consequent momentary stopping of the belt.

Our invention, which is applied to the belt 16 where indicated by reference numeral 22, insures that this belt movement stoppage is eliminated. In accordance with the principles of our invention, the upper pulley 20 is made a driving pulley, and the belt 16 is trained over a pressure pulley 24 and a take-up pulley 26.

The pressure pulley 24 presses the undersurface of the belt 16 against the pulley 20, while the take-up pulley 26 applies tension to the belt 16 between the pressure pulley 24 and the end pulley 20.

Pressure pulley 24 is also made a drive pulley, and pulleys 24 and 20 are driven in the directions indicated by the arrows of Figure 1 when the upper run of the belt 16 is to move downwardly. Rotation is reversed when the upper run of the belt 16 is to run upwardly.

Pulley 24 should be driven at a speed that will provide its periphery with a speed that is equal to that of the end pulley 20. Lower end pulley 18 may be an idler pulley in the illustrated embodiment.

A specific embodiment of the invention is diagrammatically illustrated in Figures 2 through 5. In the illustration of Figures 2 through 5, the moving sidewalk 10 is applied to an inclined ramp 30, the platform 12 being erected at the upper end of the ramp in any suitable manner. A relatively shallow well 32 is formed in the ramp 30 adjacent the end of platform 12, and mounted in the well 32 is an appropriate structural framework including spaced channels 34 fixed in any suitable manner to the transversely extending channels 36 that are embedded in the ramp 30 in the illustrated embodiment.

Side housing plates 38 at their upper ends are secured along their lower edges to the respective channels 34 (see Figures 3, 4, and 5). The upper edges of the side plates may be connected by a slide plate 40 upon which the upper run 42 of the conveyor belt 16 is supported between end pulleys 18 and 20. Slide plate 40 may be reinforced by appropriate angle irons 44 or in any other suitable manner.

The driving end pulley 20 is mounted in appropriate bearings 50 that are secured to the laterally extending portions 52 of the side plates in any suitable manner. The pulley 20 includes shaft 54 that is journalled in the bearings 50 and which has keyed to one end thereof a double strand pulley or sprocket 56. Appropriate pulley belts or chains 58 extending between the sprocket 56 and the driving sprocket 60 driven by an appropriate reversible form of prime mover 62 rotate the end pulley 20.

The pressure pulley 24 includes shaft 25 journalled in sliding bearings 64 that slidably engage track members 66 (see Figure 4). The lower track member 66 on each side of the conveyor is fixed to the portion 52 of side plate 38, while the upper track 66 on each side of the conveyor is fixed in any suitable manner to angle bracket 68 riveted to the respective plates 38 as at 70. Keyed to one end of shaft 25 is a double stranded pulley or sprocket 71 over which are trained appropriate pulley belts or chains that also engage a driving sprocket or pulley 73 driven by an appropriate reversible form of prime mover 75.

A bolt 72 extends between an appendage 74 of each bearing member 64 and a bracket 76 secured in any suitable manner to the respective plates 38 in a position spaced somewhat downhill from the pressure pulley 24. Bolt 72 carries helical spring 78 which extends between the sliding bearing 64 and an abutment plate 80 that bears against adjusting and locking nuts 82 carried by the bolt. Nuts 82 permit adjustment of the compression on spring 78. Bracket 76 may include strengthening webs 86, and stiffener members 77 are preferably secured between the plates 38 and slide plate 40.

The take-up pulley 26 in the illustrated embodiment is journalled between the diagrammatically illustrated take-ups 90 that are positioned adjacent each channel 34. The take-ups 90 each comprise an angle member 92 that slidably carries a bearing structure 94 that is actuated by a screw 96 rotatably carried by supports fixed to the angle member at its ends.

As the take-up devices 90 are conventional, no further description thereof is deemed necessary, except that on actuation of the screws 96 in the appropriate direction, the take-up pulley will move longitudinally of the conveyor. The actual take-ups employed may be of the protected screw type manufactured by Stephens-Adamson Mfg. Co. of Aurora, Illinois.

The plates 38 may be slotted as at 97 and the channels 34 recessed as at 99 (see Figure 5) to allow for the desired movement of the take-up pulley 26. Appropriate protective and decorative housing structures 100 may be mounted on either side of the conveyor (see Figures 3-5).

When the drive has been assembled in the manner illustrated in the drawing figures, the springs 78 urge the pressure pulley 24 against the upper end pulley 20. The belt 16 is trained over pulleys 18, 20, 24, and 26 as well as the slide plate 40. The belt 16 may be moved upwardly or downwardly, i.e., in either direction, by appropriately driving the pulleys 20 and 24 in the direction required. As mentioned above, pulleys 20 and 24 should be driven so that they will have the same peripheral speeds; they may be driven by the same or separate prime movers, and adjustable sheaves may be employed to match their speeds.

In operation, the drive 22 when actuated provides a positive drive in both directions. As stated above, when the belt 16 was driven (in accordance with prior practices) so that the upper run of the belt moved downwardly, slack in the belt would develop at the pulley 20 and in the portion of the belt approaching it, causing the belt to slip at its drive pulleys or pulley. This would cause at least momentary stopping of the moving sidewalk and bunching of the belt at the sealing lip adjacent to the top of end pulley 20. In accordance with our invention, the pulley 24 pressing against the pulley 20 insures a positive drive regardless of which way the belt 16 is driven, since drive is transmitted to the belt regardless of whether or not slack forms in the lower run of the belt.

Our invention provides several important results. In the first place, it has been found that less tension needs to be applied to the belt to drive same, which means that the use of a lighter take-up will suffice and consequently, a lighter, more inexpensive belt may be used in a particular installation. The pressure pulley 24 eliminates the need for application of high tensions to the belt 16.

In addition, the drive 22 occupies relatively little space. In the illustrated embodiment, the entire drive is positioned between upper and lower parallel planes extending between and tangent to the end pulleys 18 and 20. The reduction of tension (that is to be applied to the belt to drive same) permits the use of devices such as take-ups 90 that need very little room to operate in.

The foregoing description and the drawings are given merely to explain and illustrate our invention, and the invention is not to be limited thereto except in so far as the appended claims are so limited since those skilled in the art who have our disclosure before them will be able to make modifications and variations therein without departing from the scope of the invention.

We claim:

1. In a belt conveyor, the combination of an endless flexible ribbon belt, end pulleys supporting the belt with the belt having an upper load-carrying surface intermediate the end pulleys, a pressure pulley located adjacent one of said end pulleys and beneath the upper run of said belt, a movable take-up pulley also located adjacent said one end pulley, said belt being successively trained over said one end pulley, said take-up pulley and said pressure pulley, a sealing lip adjacent said one end pulley and in close sealing engagement with the load-carrying surface of the belt, means for supporting said pressure pulley to resiliently urge it toward said one end pulley to thereby compress the belt between said pressure pulley and said one end pulley, said one end pulley and said pressure pulley constituting drive pulleys for said belt, and means for reversibly driving at least one of said drive pulleys, whereby said one end pulley serves to drive the belt in a direction leading from the load-carrying surface to said one end pulley, and the pressure pulley serves to drive the belt in the opposite direction, said take-up pulley serving to maintain a firm wrap around said one end pulley irrespective of the direction of travel of said belt, and preventing the formation of slack in the belt adjacent to said sealing lip.

2. A belt conveyor as set forth in claim 1 in which said take-up pulley is also located beneath the upper run of the belt and is shiftable in a direction generally parallel to the movement of the upper run of the belt to adjust tension in the belt.

References Cited in the file of this patent

UNITED STATES PATENTS

| 1,762,772 | Fisher | June 10, 1930 |
| 1,764,791 | Ingle | June 17, 1930 |
| 2,759,594 | Kleboe | Aug. 21, 1956 |

FOREIGN PATENTS

| 11,156 | Great Britain | Sept. 7, 1905 |